(12) United States Patent
Sun et al.

(10) Patent No.: US 6,949,877 B2
(45) Date of Patent: Sep. 27, 2005

(54) ELECTRON EMITTER INCLUDING CARBON NANOTUBES AND ITS APPLICATION IN GAS DISCHARGE DEVICES

(75) Inventors: Xiao-Dong Sun, Mountain View, CA (US); Feng Jin, Sagamore Hills, OH (US); Anant Achyut Setlur, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 131 days.

(21) Appl. No.: 09/681,374

(22) Filed: Mar. 27, 2001

(65) Prior Publication Data

US 2002/0171357 A1 Nov. 21, 2002

(51) Int. Cl.⁷ .............................. H01J 1/14; H01J 19/06; H01J 1/04
(52) U.S. Cl. .................. 313/491; 31/311; 31/346 R
(58) Field of Search ................... 313/310, 311, 313/326, 336, 351, 346 R, 491, 574, 631–633, 309, 622; 427/77, 78, 249; 445/49, 50, 51; 252/502, 509, 506

(56) References Cited

U.S. PATENT DOCUMENTS

| | | | |
|---|---|---|---|
| 5,495,143 A | | 2/1996 | Lengyel et al. ............. 313/574 |
| 5,686,789 A | | 11/1997 | Schoenbach et al. ....... 313/491 |
| 6,057,637 A | * | 5/2000 | Zettl et al. .................. 313/310 |
| 6,097,138 A | * | 8/2000 | Nakamoto .................. 313/309 |
| 6,137,225 A | * | 10/2000 | Heuvelmans et al. ....... 313/580 |
| 6,140,045 A | * | 10/2000 | Wohlstadter et al. ......... 435/6 |
| 6,172,453 B1 | * | 1/2001 | Hamada et al. ............. 313/491 |
| 6,239,547 B1 | * | 5/2001 | Uemura et al. ............. 313/495 |
| 6,250,984 B1 | * | 6/2001 | Jin et al. ..................... 445/51 |
| 6,294,867 B1 | * | 9/2001 | Lynn .......................... 313/422 |
| 6,333,598 B1 | * | 12/2001 | Hsu et al. ................... 313/495 |
| 6,346,775 B1 | * | 2/2002 | Lee et al. ................. 315/169.3 |
| 6,451,175 B1 | * | 9/2002 | Lal ............................. 204/173 |
| 6,486,609 B1 | * | 11/2002 | Shiratori et al. ......... 315/169.3 |
| 6,559,582 B2 | * | 5/2003 | Miyamoto et al. ...... 313/346 R |
| 2002/0070648 A1 | * | 6/2002 | Forsberg .................... 313/309 |
| 2002/0121856 A1 | * | 9/2002 | Tsai ........................... 313/491 |
| 2003/0042128 A1 | * | 3/2003 | Harutyunyan et al. ... 204/158.2 |

FOREIGN PATENT DOCUMENTS

| | | | | |
|---|---|---|---|---|
| JP | 57-096453 | * | 6/1982 | ......... H01J/61/067 |
| JP | 57096453 A | * | 6/1982 | ......... H01J/61/067 |

OTHER PUBLICATIONS

PTO/2003–4901; English translation of JP 57-096453 published Jun. 15, 1982 to Sugiyama.*

* cited by examiner

Primary Examiner—Joseph Williams
Assistant Examiner—Peter Macchiarolo
(74) Attorney, Agent, or Firm—Fletcher Yoder

(57) ABSTRACT

An electron emitter includes a coating layer of a mixture of carbon nanotubes and alkaline-earth metal oxides on an electrically conducting structure. The preferred carbon nanotubes are those having a diameter less than about 200 nm. A substantial portion of electron emission is liberated from the carbon nanotubes, thus lessening the requirement on the alkaline-earth oxides. Such an electron emitter is advantageously used in gas discharge devices to increase the energy efficiency thereof.

6 Claims, 3 Drawing Sheets

ELECTRON EMITTER INCLUDING CARBON NANOTUBES AND ITS APPLICATION IN GAS DISCHARGE DEVICES

BACKGROUND OF INVENTION

1. Field of the Invention

The present invention relates to electron emitters that include carbon nanotubes and the application thereof in gas discharge devices. More particularly, the present invention relates to cathodes of fluorescent lamps that include carbon nanotubes.

2. Description of the Related Art

A source of electrons is required in the operation of many devices such as vacuum microelectronic, cathodoluminescent, and gas discharge devices. One common gas discharge device is a fluorescent lamp. In a gas discharge device, the electrons emitted from a cathode migrate to an anode while ionizing a background gas and propagating the discharge. At the cathode of a gas discharge device, the electrons are conventionally generated by thermionic or secondary emission processes. The thermionic emission process employs a low work function material which is raised to a high temperature to liberate electrons into the surrounding environment. Secondary emission processes employ a cathode material having a high secondary electron yield coefficient to liberate electrons when it is impacted by ions, other electrons, or photons.

Thermionic emission cathode materials are heated to very high temperatures for their operation, typically greater than 1000° C., with the attendant shortcomings. First, this heating requires power, which reduces the overall energy efficiency of the gas discharge device. Second, the emissive material on the cathode slowly boils off into the surrounding environment at the required elevated temperature, resulting in limited lifetime of the cathode. This boiled-off material also can have deleterious effects on the performance of other chemically sensitive materials in the gas discharge device, such as phosphors. Finally, the elevated cathode temperature renders the cathode materials moderately chemically reactive, and therefore care must be taken in engineering the surrounding environment such that other materials in the system do not react with and poison the cathode emissive materials.

Cathodes designed to use secondary electron emission processes rely on incident ions, electrons, or photons to initiate a cascade which can then be self-supporting. To generate enough ions for self-supporting of a discharge, the cathode fall is usually much higher than that of the thermionic-emission devices. Electron emission from the cathode is primarily due to ion impact, which transfers a significant amount of energy to the cathode substrate as a result of the surface collision, resulting in a net energy loss from the device beyond the energy required to liberate the counter-propagating electrons. These factors result in a low efficiency in generating electrons. Furthermore, ion impact also results in sputtering of the cathode material and leads to some of the problems of thermionic emission.

These shortcomings are intrinsic to currently used cathodes in gas discharge devices. The energy efficiency of these devices would be greatly enhanced if the energy supplied to the cathode is used only for liberating electrons from its surface. Field emitters theoretically can avoid many of these shortcomings. Field emitters are devices that provide emission of electrons from the surface of an electrical conductor or semiconductor under an imposition of an electric field at temperatures not much higher than room temperature. Typically, the electric field required for electron emission from a surface of field emitters is on the order of about $10^8-10^9$ V/m. However, this required high electric field is not available in typical gas discharge devices such as fluorescent lamps. Recently, carbon nanotubes have received much attention as a promising material for field emission applications because their diameters, in the nanometer range, approach molecular scale, which offer a great intensification of electric field at their tips. Research has been directed to using carbon nanotube arrays as electron guns for flat panel display. Other structures having a nano dimension also have been used for field emission. U.S. Pat. No. 5,495,143 discloses the field intensification with the assistance of nanostructures made of metals and metallic compounds having sharp tips was used to provide field emission in gas discharge devices. A similar concept disclosed in U.S. Pat. No. 5,686,789 was applied in cathodes of other gas discharge devices, which cathodes include microscopic holes of non-specific shapes. However, there has not been any attempt to use carbon nanotubes in the area of gas discharge devices to improve the energy efficiency thereof. In light of the inefficiencies of gas discharge devices, it is very desirable to provide a cathode material that can be used for an electron emitter in these devices and does not require as high an electric field as prior-art materials for field emission. It is also desirable to provide an electron emitting material that can be made easily and inexpensively. It is further desirable to use carbon nanotubes to improve the energy efficiency of gas discharge devices.

SUMMARY OF THE INVENTION

In general, the present invention provides a composition for electron emitters or cathodes of gas discharge devices that can overcome many disadvantages of cathodes of prior-art devices. In the present disclosure, "electron emitters" and "cathodes" are used interchangeably to mean devices, apparatuses, or structures that are capable of providing a stream or a burst of free electrons. The composition of the present invention comprises a mixture of carbon nanotubes and oxygen-containing compounds of alkaline-earth metals. Typically, these oxygen-containing compounds of alkaline-earth metals are alkaline-earth triple oxide. Such an alkaline-earth triple oxide has been used as a coating on the cathode coils of fluorescent lamps to produce a stream of electrons in a thermionic process. The mixture of carbon nanotubes and alkaline-earth triple oxide may be coated on a filament of a metal or a metallic compound having a low work function to form a cathode of a gas discharge device. The composition of the present invention offers a comparable electron current at a lower cathode temperature; thus, helps to reduce the amount of energy expended in maintaining the cathode temperature. Furthermore, the resistance of carbon materials to sputtering in a high vacuum environment offers a reduction in the background gas pressure in gas discharge devices and an accompanying increase in luminous output.

In another aspect of the present invention, a fluorescent lamp has a cathode the surface of which is deposited with a mixture of carbon nanotubes and an alkaline-earth triple oxide. The fluorescent lamp has a background pressure of less than about 0.3 kPa.

In still another aspect of the present invention, a method for making a cathode of a gas discharge device comprises the steps of providing an amount of carbon nanotubes and an amount of oxygen-containing compounds of alkaline-earth metals in proportions such that an electron emission from the carbon nanotubes is substantial in relation to the total quantity of electrons emitted from the cathode; mixing the carbon nanotubes and the oxygen-containing compounds of alkaline-earth metals to form a mixture; providing an electrically conducting cathode structure; depositing the mixture on the cathode structure; and converting the oxygen-containing compounds of alkaline-earth metals to alkaline-earth metal oxides.

In still another aspect of the present invention, particles of a metal catalyst are mixed and dispersed in the mixture of oxygen-containing compounds of alkaline-earth metals before the mixture is applied on the cathode structure. The oxygen-containing compounds of alkaline-earth metals are then converted to alkaline-earth metal oxides. Carbon nanotubes are subsequently grown on the dispersed metal Catalyst particles within the coating layer of the cathode structure.

Other benefits and features of this invention may become evident by a perusal of the description and appended claims together with the attached figure.

DETAILED DESCRIPTION

Figure 1:
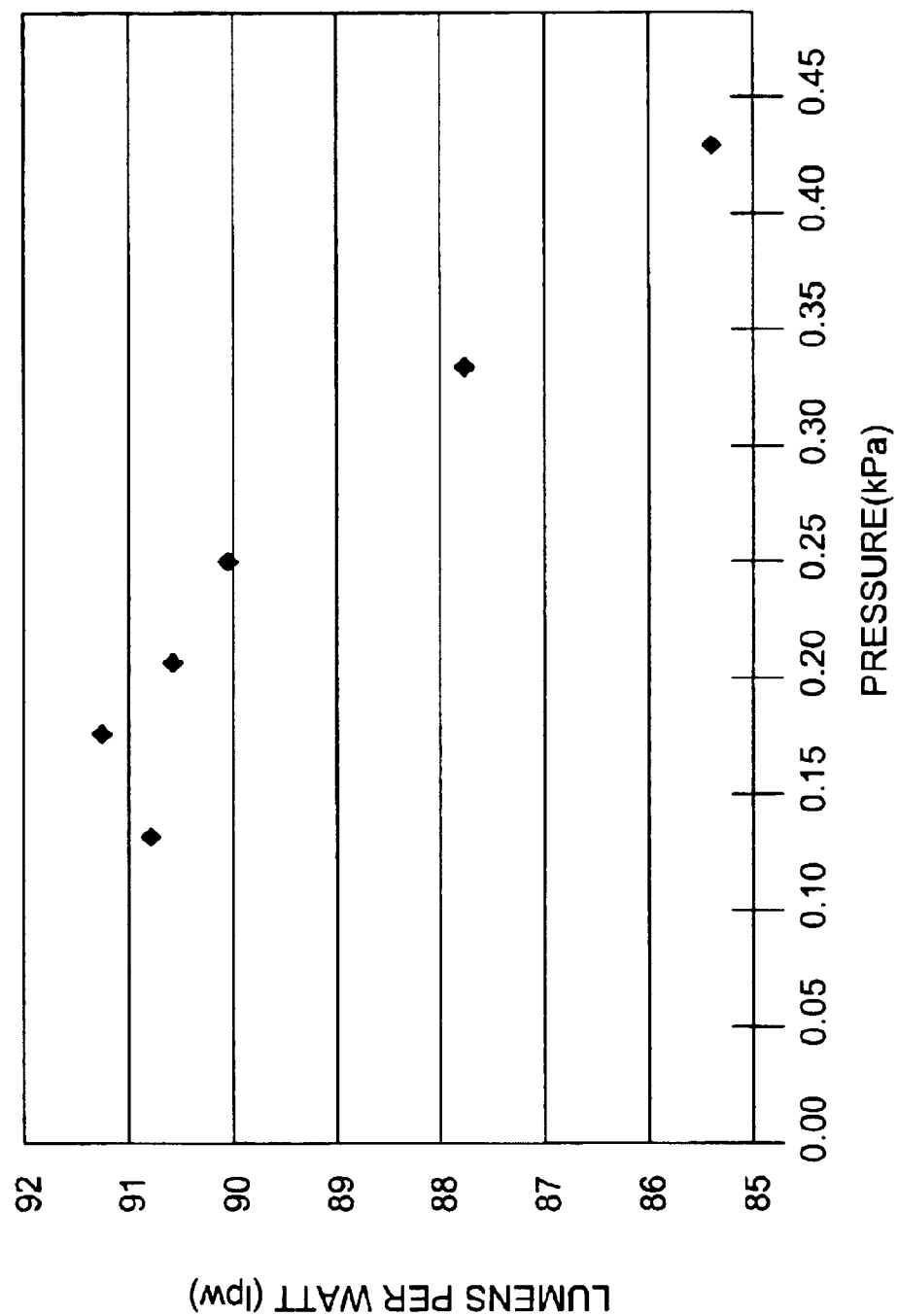
FIG. 1 shows luminous output of fluorescent lamps as a function of krypton background gas pressure.
Figure 2:
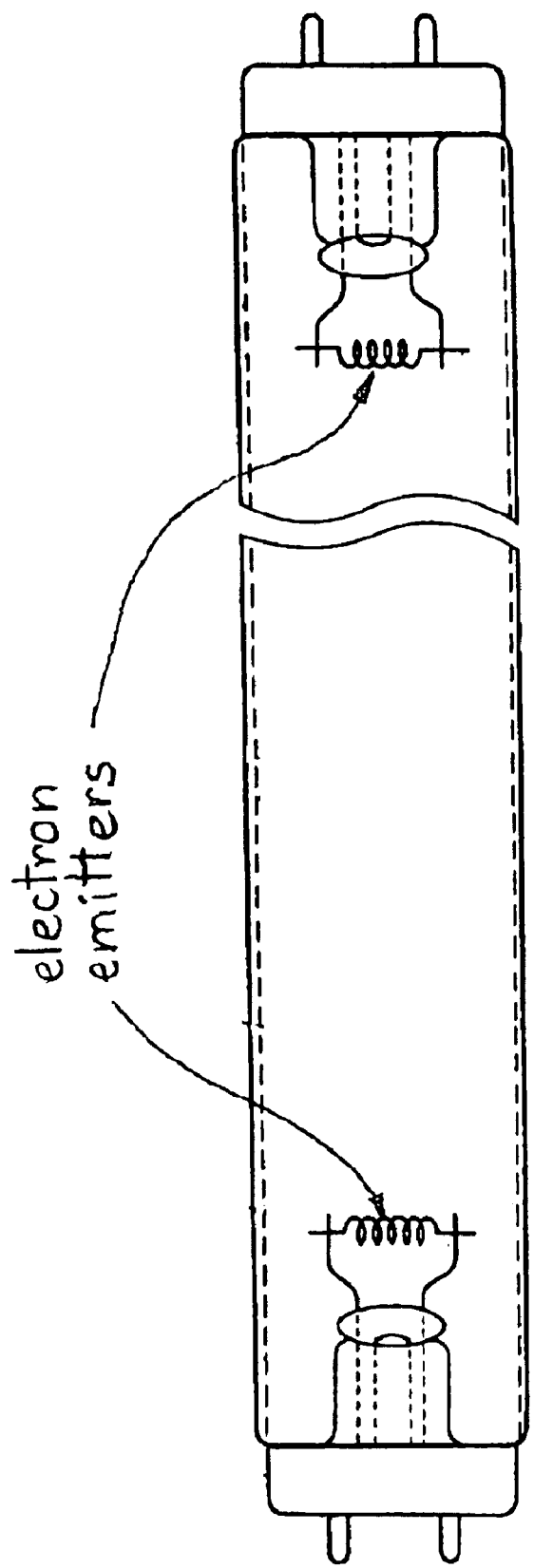
FIG. 2 shows schematically a prior-art gas discharge device.
Figure 3:
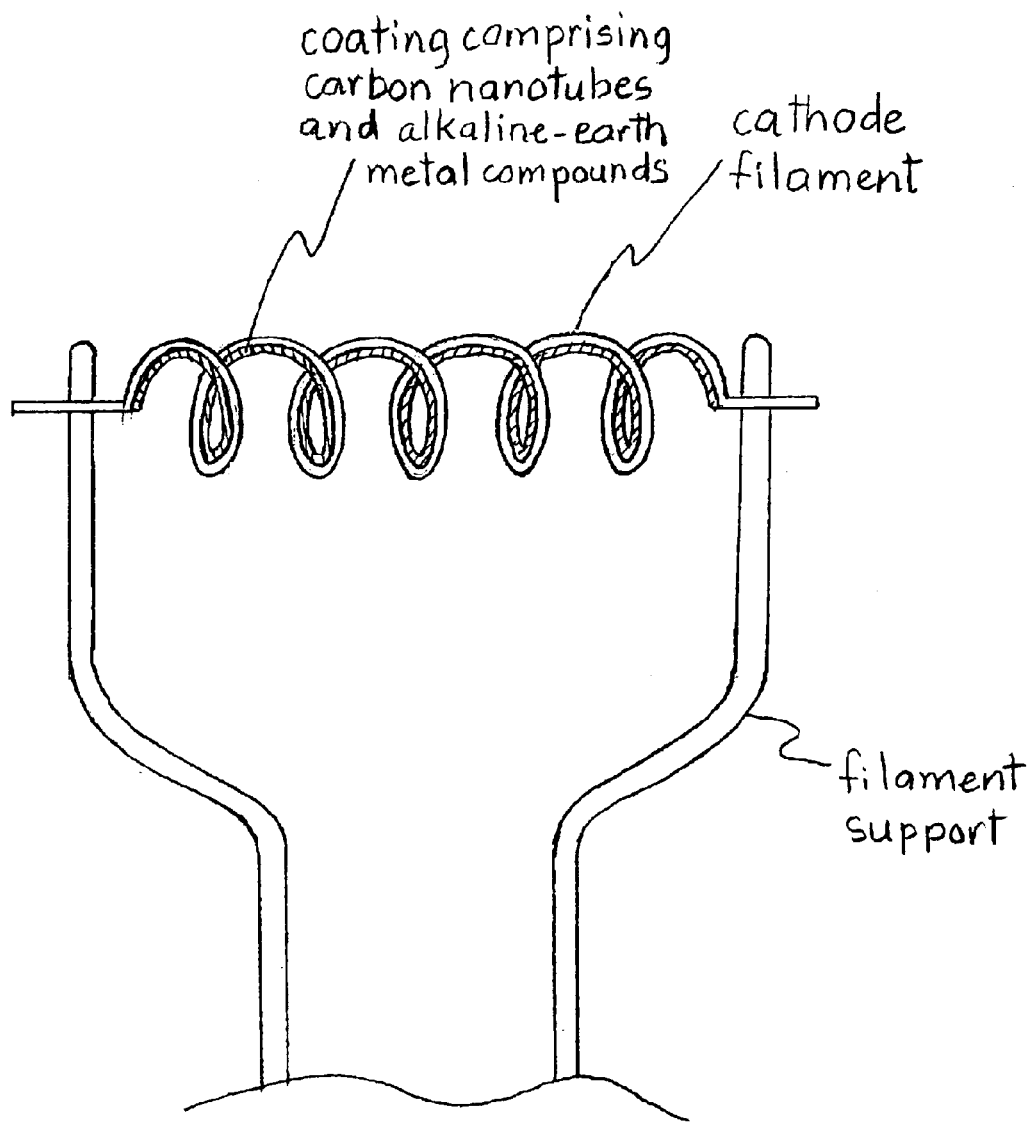
FIG. 3 shows an electron emitter of the present invention comprising a cathode filament having a coating that comprises carbon nanotubes and alkaline-earth metal compounds.

The present invention provides a composition for cathodes of gas discharge devices, and more particularly, for fluorescent lamps. The composition of the present invention comprises a mixture of carbon nanotubes and oxygen-containing compound of alkaline-earth metals. Typically, the oxygen-containing compounds of alkaline-earth metals are alkaline-earth metal oxides. In a conventional fluorescent lamp, a stream of free electrons is liberated from the cathode, migrates to the anode, and ionizes a gas at a very low pressure in the process. The cathode is typically a coiled filament of a metal, such as tungsten, coated with a triple oxide of calcium, barium, and strontium that have low work functions. During operation of the fluorescent lamp, an amount of about two watts of electrical energy is supplied to the cathode material to heat it to a very high temperature, typically exceeding 1000° C., to liberate the electrons from the coated filament. In the well-known mercury fluorescent lamp, a small amount of mercury is contained in the lamp to provide the discharge. In addition a background gas is necessary to reduce the required open circuit voltage for starting the discharge and to lessen the severity of a bombardment of the cathode by high-speed ions, which would damage and shorten the life of the cathode. A rare gas such as argon or a mixture of argon and krypton or neon is used as the background gas at a pressure of about 0.3–0.5 kPa. The FIG. shows the luminous output of krypton-filled fluorescent lamps measured as lumens per watt ("lpw") as a function of krypton gas pressure. It is evident that the typical background pressure chosen to minimize the effect of damaging high-speed ions does not provide the optimum luminous output. Therefore, the lamp would be more energy-efficient if a cathode material could be used at a lower background gas pressure without being damaged. The composition of the present invention offers the promise of achieving this condition because of the resistance of carbon nanotubes to sputtering and evaporation at very high temperatures. Furthermore, it was estimated that the electric field at the tips of the carbon nanotubes could be intensified by a factor of at least 1000 because of the very small diameters of these nanotubes. Therefore, the composition of the present invention can provide an electron current comparable to that generated from conventional triple oxide-coated cathodes at a lower temperature and a lower cathode fall due to a lower cathode potential. Cathode fall or cathode fall voltage is the potential difference between the arc stream and the cathode. Both a lower cathode temperature and a lower cathode fall contribute to increasing the energy efficiency of the gas discharge device. Moreover, a lower cathode temperature would increase the life of the cathode because of a lower evaporation rate of the triple oxide emission material. It is estimated that the rate of evaporation of the triple oxide emission material is reduced by about 50 percent for every decrease in the cathode temperature of about 30–50° C.

Carbon nanotubes are typically made by catalytic cracking and pyrolyzing of a low molecular weight hydrocarbon on a metal catalyst surface. The low molecular-weight hydrocarbon may be an alkyne or an alkene having 2 to 5 carbon atoms inclusive or an alkane having 1 to 5 carbon atoms inclusive. Other hydrocarbons having higher or lower molecular weights may be used with appropriate catalysts to produce carbon nanotubes. For example, substituted or unsubstituted aromatic hydrocarbons having 1 to 3 rings inclusive may be used. Preferred hydrocarbons are acetylene, ethylene, and propylene. The hydrocarbons in a gaseous state also may be mixed with an inert gas such as nitrogen, helium, neon, argon, krypton, or xenon. Catalysts for this process are nickel, cobalt, chromium, iron, mixtures thereof, and alloys thereof. The catalyst is preferably divided into fine particles having sizes in the micrometer range; for example, from about 0.1 to about 50 $\mu$m. The catalyst is preferably supported on a porous solid such as alumina or silica. The process of cracking and pyrolyzing may be done at a temperature in the range from about 400° C. to about 1200° C. The chosen temperature typically depends on the hydrocarbon being cracked. The higher molecular weight materials typically require higher temperatures. Preferably, the temperature is in the range from about 400° C. to about 700° C. Carbon nanotubes typically have a diameter in the range from about 1 nm to about 200 nm. The diameter of carbon nanotubes is preferably in the range from about 1 nm to about 1 00 nm, more preferably from about 1 nm to about 50 nm, and most preferably from about 1 nm to about 20 nm. Although the foregoing describes the preferred method of making carbon nanotubes, the present invention is not limited by the manner in which carbon nanotubes are made as long as they have a diameter in the above-mentioned ranges.

EXAMPLE

A mixture of the present invention was made with 25% (by volume) of carbon nanotubes and 75% (by volume) of a conventional alkaline-earth triple carbonate. A small amount of a temporary binder, such as a resin or a starch, may be advantageously added into the mixture. The exact quantity of the temporary binder is not critical. The mixture was deposited by spraying on a coiled cathode of a conventional T8 fluorescent lamp (General Electric Company, Cleveland, Ohio) and the alkaline-earth carbonates were converted to alkaline-earth oxides in a non-oxidizing atmosphere as is well known in the art. The coiled cathodes having the coating layer of carbon nanotubes and alkaline-earth metal oxides were installed in conventional T8 fluorescent lamps. Twenty-four such lamps were produced for testing. In addition, twenty-three T8 fluorescent lamps also were made using the conventional alkaline-earth metal oxide emission mixture without carbon nanotubes for comparative testing. Cathode fall, cathode temperature, lamp voltage, and lamp current were measured for each fluorescent lamp. The result of the average and standard deviation for each of the measured parameters is shown below.

|  | This Invention | Prior-Art |
| --- | --- | --- |
| Cathode Fall (V) | 12.04 ± 0.48 | 12.89 ± 0.71 |
| Cathode Temperature (° C.) | 1074 ± 38 | 1094 ± 43 |
| Lamp Voltage (V) | 134.2 ± 1.0 | 137.3 ± 2.1 |
| Lamp Current (A) | 0.263 ± 0.000 | 0.262 ± 0.001 |

The cathode fall, cathode temperature and lamp voltage for the lamp of the present invention are lower than the corresponding parameters of the prior-art lamp, indicating that it is easier to liberate electrons from the cathodes of the lamps of the present invention. The twenty-degree reduction from the cathode temperature of the prior-art lamp is significant in prolonging the life of the cathode in view of the estimate that the evaporation rate of the alkaline-earth emission mixture is reduced by about 50 percent for every 30–50° C. of cathode temperature.

In another aspect of the present invention, the cathode coated with a mixture of carbon nanotubes and alkaline-earth triple oxide is installed in a fluorescent lamp. Carbon nanotubes provide a portion of the electrons required for generating and maintaining the discharge, thus lessening the requirement on the alkaline-earth triple oxide emission mixture. Therefore, the temperature of the cathode may be reduced and the life of the cathode may be extended. And since the carbon nanotubes can help to provide a comparable electron current at a lower open circuit voltage, the background gas pressure in the fluorescent lamp may be reduced to achieve a higher luminous output. Background gas pressure may be advantageously reduced to about 0.1–0.2 kPa according to the Figure to achieve an optimum luminous output in a krypton-filled fluorescent lamp. Similarly, the background gas pressure may be reduced for lamps filled with other rare gases.

A cathode of the present invention for a gas discharge device may be made by a process comprising the step of (1) providing an amount of carbon nanotubes and an amount of oxygen-containing compounds of alkaline-earth metals in proportions such that an electron emission from the carbon nanotubes is a substantial portion; such as at least 10 percent, preferably at least 20 percent, more preferably at least 50 percent, and most preferably at least 80 percent; of the total number of electrons emitted from the cathode; (2) mixing the carbon nanotubes and the oxygen-containing compounds of alkaline-earth metals to form a mixture; (3) providing an electrically conducting cathode structure such as a sleeve, a stick, a coil, a coiled coil, or a triple coil; (4) depositing the mixture on the cathode structure; and (5) converting the oxygen-containing compounds of alkaline-earth metals to alkaline-earth metal oxides to form a finished coating layer comprising carbon nanotubes and alkaline-earth metal oxides. The oxygen-containing compounds of alkaline-earth metals may be selected from the group consisting of carbonates, nitrates, oxalates, citrates, and acetates. The proportion of carbon nanotubes in the finished coating layer may be from about 0.1 percent by volume to about 95 percent by volume, preferably from about 5 percent by volume to about 90 percent by volume, more preferably from about 20 percent by volume to about 90 percent by volume, and most preferably from about 30 percent by volume to about 90 percent by volume. The deposition of the mixture of carbon nanotubes and oxygen-containing compounds of alkaline-earth metals on the cathode structure may be carried out by painting, dipping, spraying, or electrophoresis. The conversion of oxygen-containing compounds of alkaline-earth metals to alkaline-earth metal oxides is preferably done in a non-oxidizing atmosphere at a temperature and for a time sufficient to substantially complete the conversion. Typically, a temperature in the range from about 1000° C. to about 1700° C. is sufficient for this conversion. More typically, the temperature is in the range from about 1200° C. to about 1500° C.

In another aspect of the present invention, the oxygen-containing compounds of the alkaline-earth metals are mixed with particles of a metal catalyst to form a mixture. A small amount of a temporary binder, such as an epoxy resin or a starch, may be added in the mixture to help its adherence to the cathode structure. Such a temporary binder is typically decomposed or burnt off during a subsequent firing of the coated cathode. The mixture is deposited on the cathode structure by painting, dipping, spraying, or electrophoresis. The coated cathode is then fired in a non-oxidizing atmosphere to convert the oxygen-containing compounds of alkaline-earth metals to alkaline-earth metal oxides. Carbon nanotubes are then formed on the catalyst particles dispersed within the layer of alkaline-earth metal oxides by any cracking and pyrolyzing process mentioned above. The finished cathodes are installed in gas discharge devices by any well-known method to provide an increase in efficiency thereto.

While specific preferred embodiments of the present invention have been described in the foregoing, it will be appreciated by those skilled in the art that many modifications, substitutions, or variations may be made thereto without departing from the spirit and scope of the invention as defined in the appended claims.

What is claimed is:

1. A composition for electron emitters of gas discharge devices comprising a mixture of carbon nanotubes and oxygen-containing compounds of alkaline-earth metals, wherein said oxygen-containing alkaline-earth metals are alkaline-earth metal oxides, said carbon nanotubes have a diameter in a range from about 1 nm to about 200 nm.

2. The composition according to claim 1 wherein said diameter is in a range from about 1 mm to about 100 nm.

3. The composition according to claim 1 wherein a proportion of said carbon nanotubes in said mixture of carbon nanotubes and alkaline-earth metal oxides is in a range from about 0.1 percent by volume to about 95 percent by volume.

4. The composition according to claim 3 wherein said proportion is from about 5 percent by volume to about 90 percent by volume.

5. A composition for electron emitters of gas discharge devices comprising a mixture of carbon nanotubes and oxygen-containing compounds of alkaline-earth metals, wherein said oxygen-containing alkaline-earth metals are alkaline-earth metal oxides, said carbon nanotubes have a diameter in a range from about 1 nm to about 200 nm, and a proportion of said carbon nanotubes in said mixture of carbon nanotubes and alkaline-earth metal oxides is in a range from about 0.1 percent by volume to about 95 percent by volume.

6. A composition for electron emitters of gas discharge devices comprising a mixture of carbon nanotubes and oxygen-containing compounds of alkaline-earth metals, wherein said oxygen-containing alkaline-earth metals are alkaline-earth metal oxides, said carbon nanotubes have a diameter in a range from about 1 nm to about 200 nm, and a proportion of said carbon nanotubes in said mixture of carbon nanotubes and alkaline-earth metal oxides is in a range from about 5 percent by volume to about 90 percent by volume.

* * * * *